June 30, 1959  J. C. SEWARD  2,892,481
COMBINED LUGGAGE CARRIER AND SEATING UNIT FOR VEHICLES
Filed July 18, 1957  4 Sheets-Sheet 1

Inventor:
James Cannon Seward
By his attorneys:
Baldwin & Wight

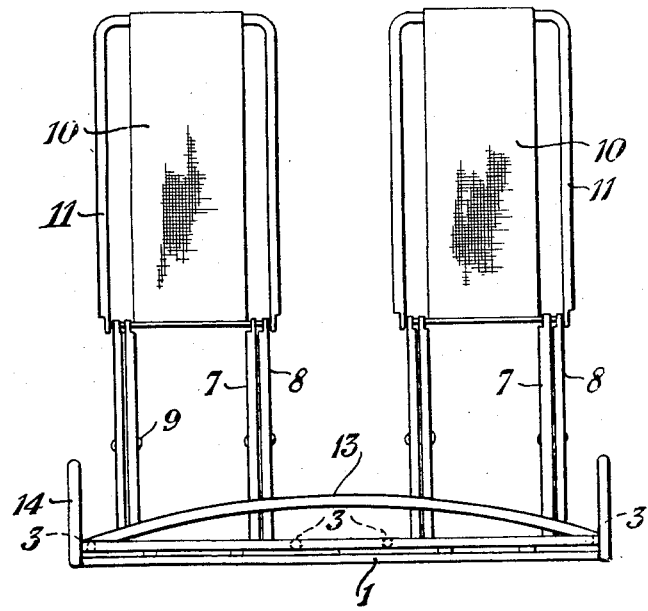
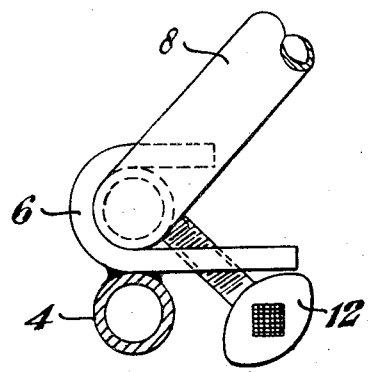

June 30, 1959 J. C. SEWARD 2,892,481
COMBINED LUGGAGE CARRIER AND SEATING UNIT FOR VEHICLES
Filed July 18, 1957 4 Sheets-Sheet 3

Inventor:
James Cannon Seward
By his attorney:
Baldwin & Wight

June 30, 1959 J. C. SEWARD 2,892,481
COMBINED LUGGAGE CARRIER AND SEATING UNIT FOR VEHICLES
Filed July 18, 1957 4 Sheets-Sheet 4

Inventor:
James Cannon Seward
By his attorneys:
Baldwin + Wight

United States Patent Office 2,892,481
Patented June 30, 1959

2,892,481
COMBINED LUGGAGE CARRIER AND SEATING UNIT FOR VEHICLES

James Cannon Seward, Thame, Oxon, England

Application July 18, 1957, Serial No. 672,759
Claims priority, application Great Britain November 14, 1956

1 Claim. (Cl. 155—5)

The invention relates to motor vehicles, more particularly of the saloon type, and is intended for use when the car or other vehicle is used for attending point to point races and other functions of which a good view is desired.

According to the invention a combined luggage carrier and roof seat construction for mounting on the roof of a motor vehicle comprises a framework, bars running in one direction of the framework and fixed therein for supporting luggage, and one or more roof seats incorporated in the framework as a permanent attachment thereto and adapted to be folded down between the aforesaid bars when out of use so as not to project above the level thereof.

According to a further feature of the invention, the seats themselves when folded down constitute at least a part of the structure for supporting the baggage.

Figure 1:
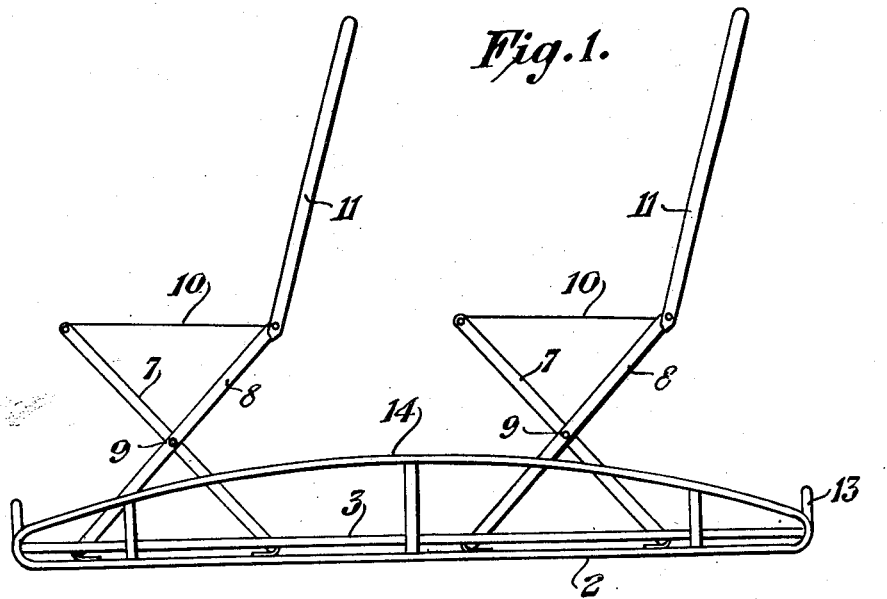
Figure 3:
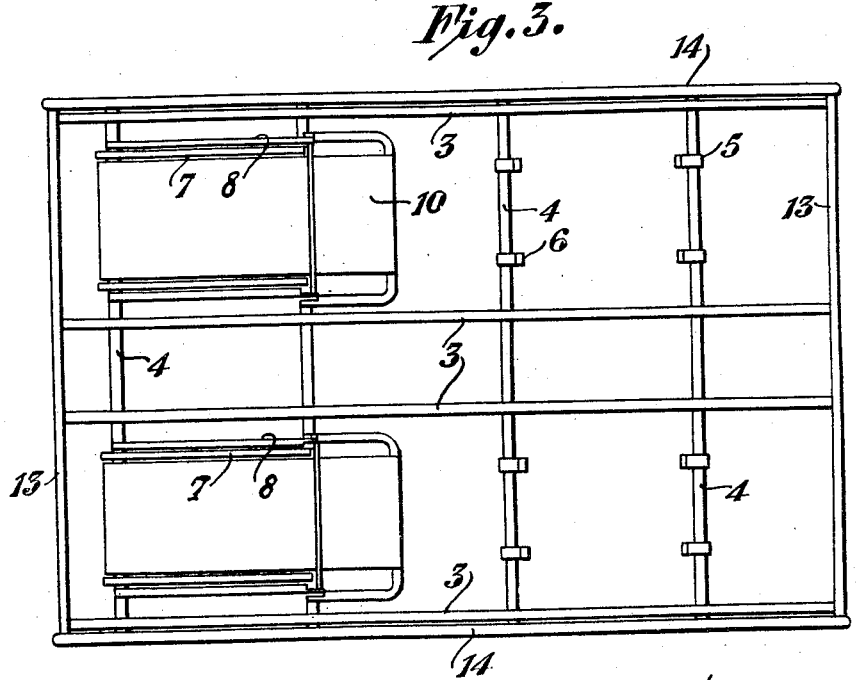
Figure 5:
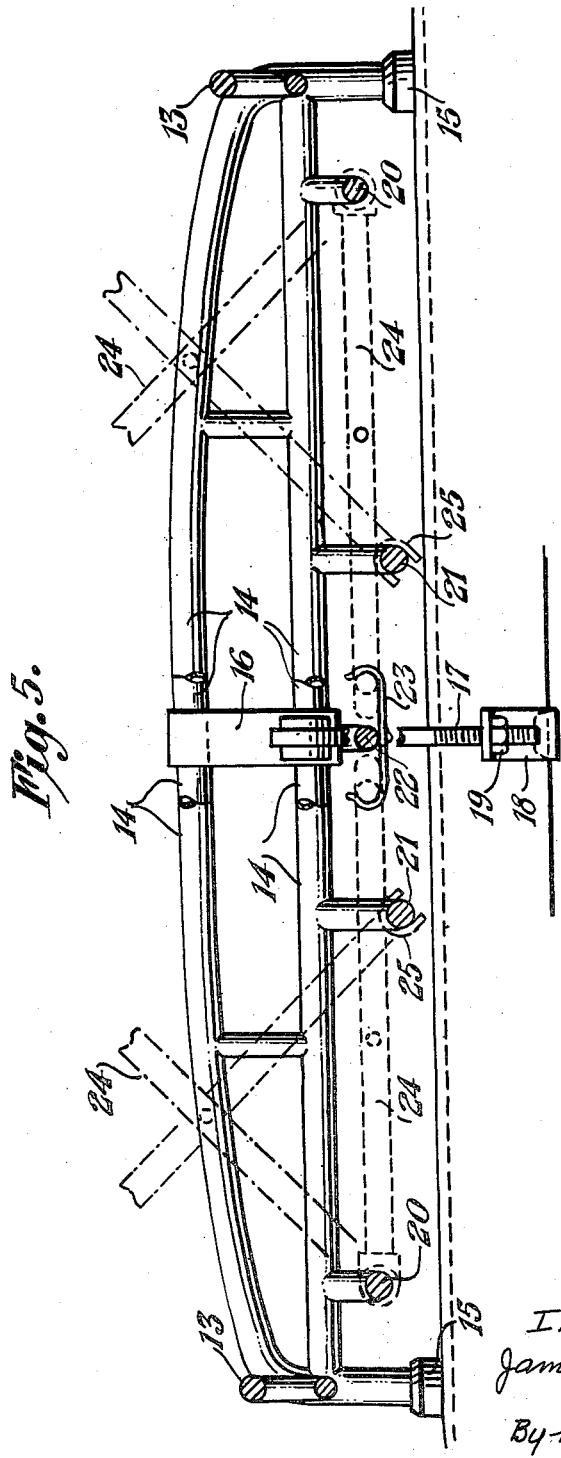
Figure 6:
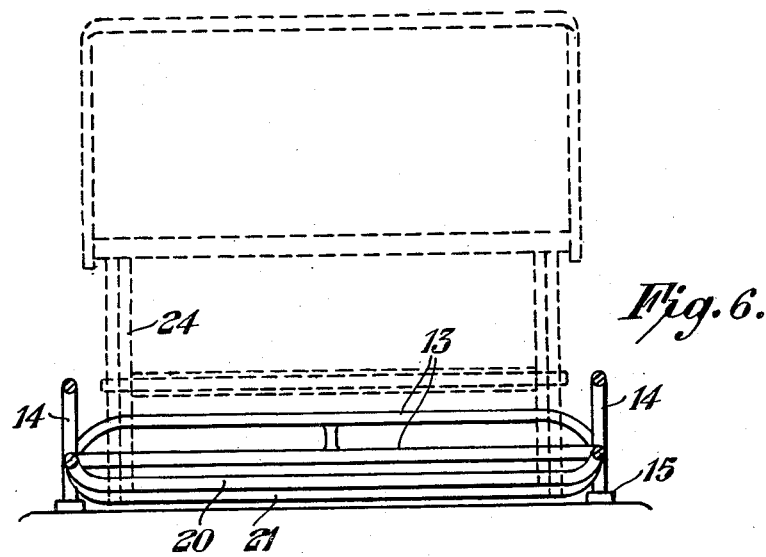
Figure 7:
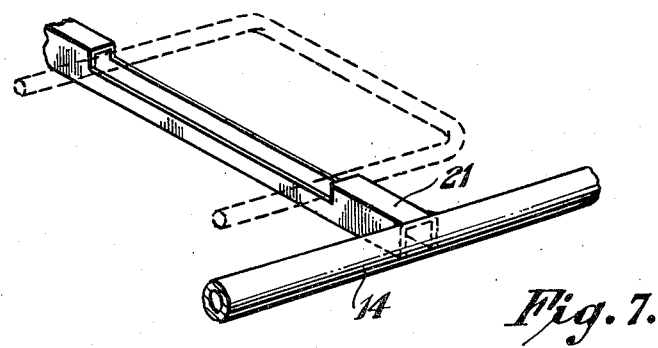
Figure 8:
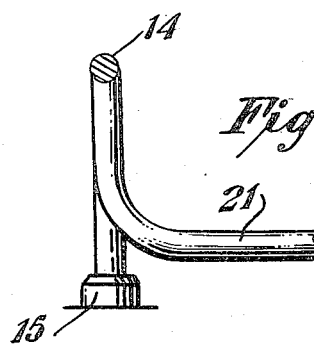

The invention is illustrated by embodiments shown in the accompanying drawings in which Figure 1 is a side elevation of one constructional form with the seats erected for use, Figure 2 is a front elevation of the same, Figure 3 is a plan with two seats removed, Figure 4 shows a detail of the seat fixing on an enlarged scale, Figure 5 is a side elevation of an alternative form of construction in which the seats when folded down assist in supporting the luggage, Figure 6 is a sectional front elevation of the same, an erected seat being shown dotted, Figure 7 is a fractional perspective view to show a modification, and Figure 8 shows a further modification.

Referring first to Figures 1 to 4 of the drawings, a luggage carrier framework or openwork frame comprises crossbars 1 and longitudinal bars 2. Longitudinal bars 3 fixed to the framework serve to support luggage placed on the rack. Crossbars 4 are fitted to carry the seats and have hinged members 5 and hook members 6 welded to them. Considering first a rear seat, side members 7 are hinged at 5 to the crossbar 4, and side members 8 are adapted to hook into and thus be detachably connected to the members 6. The side members 7 and 8 are pivoted together in pairs at 9 to constitute the framework of a chair, to which a flexible seat 10 of canvas or plastic is attached in the manner of a deck chair. A back frame 11 is hinged to the top of the member 8 and is likewise provided with flexible material 10 to constitute the back.

In Figures 1 and 2 the seat is shown erected in a raised position for use. In Figure 3 two seats have been removed to show some of the parts just described. When erecting the seat, the member 8 is placed in the hook 6 and is held fast there by a thumb screw 12 as shown in Figure 4. When it is required to fold the seat, the thumb screw 12 is unscrewed, the frame member 8 is taken out of the hook 6 and the frame members 7 pivoted down to a stowed position at a level below the top bars of the luggage rack. The back 11 also folds over on to the top of the members 7 and 8.

A second rear seat is arranged beside the one described, and front seats are arranged similarly to the back seats, except that the members 8 are hinged and the members 7 engaged in hooks similar to 6 of Figure 4.

There are also arched bars 13 and 14 above the cross bars 1 and longitudinal bars 2 respectively to restrict any sliding movement of luggage placed on the rack. The arched bars 13 and 14 in Figure 3 hide the bars 1 and 2 respectively.

There may be more or less seats than four, depending on the size of the vehicle, but in any case the number to be provided should be commensurate with the strength of the roof.

In the form of construction shown in Figures 5 and 6 the seats themselves when folded down form a part of the luggage support. The main frame comprises main upper and lower arched crossbars 13 braced together and main upper and lower arched longitudinal bars 14 braced together, the bars 13 and 14 constituting a fender to prevent luggage from slipping off the rack. The bars 13 and 14 terminate in feed 15, which rest on the car roof. Fixing is effected on each side by a strap 16, a link 17, a hook 18 and a nut 19, the hook being adapted to engage a suitable part of the car body.

Near the front and rear ends two transverse luggage bars 20 are attached to the lower bars 14 as part of the luggage support, and at an intermediate position two further transverse bars 21 are similarly attached but with a slightly lower dip. A control transverse bar 22 runs between the lower bars 14 at the same level as the bars 20 and carries two pairs of hooks 23.

Two seats are shown by their crossed supporting legs 24, of which one is pivoted on the bar 20 and the other is provided with a crutch 25 to rest on the bar 21 when erected as shown by the chain dotted line in Figure 5. The plain dotted lines in Figure 5 show the seats collapsed, in which a bar of each adjacent to the crutches 25 rests on the appropriate hook 23, so that the seat frame completes the luggage support. The seat frames also rest on the bars 21 to provide adequate support. The seat shown in Figure 6 will take two persons side by side or possibly more, but single seats as shown in Figures 1, 2 and 3 may be used instead.

The bars may be solid but will mostly be tubular. Channel sections are also possible as shown for example in Figure 7 for the bars 21, which in this case are partly cut away to receive the collapsed seats instead of being bent lower than the bars 20.

Figure 8 shows an alternative construction in which the transverse bars 13 and longitudinal bars 14 are not double as described above but are all single. The bars 21 are fixed at their ends to the bars 14 and sweep down to a suitable level at their intermediate parts.

What I claim is:

In a combined luggage carrier and folding roof seat for mounting on the roof of a motor vehicle, an openwork frame comprising a plurality of bars including bars at the bottom of the frame for supporting luggage and bars above the bottom of the frame for preventing luggage from being horizontally displaced from said frame; at least one seat comprising four crossed legs pivotally connected to each other in pairs; means including hinge means pivotally mounting one leg of each pair on said frame for enabling movement of said seat from a stowed position within said frame and below the top thereof to a raised position in which said seat extends above the top of said frame; and means on said frame for detachable connection to the other leg of each pair when said seat is in its raised position.

References Cited in the file of this patent
FOREIGN PATENTS
755,336     Great Britain _____ Aug. 22, 1956